United States Patent [19]

Yamanashi

[11] Patent Number: 4,854,682
[45] Date of Patent: Aug. 8, 1989

[54] COMPACT HIGH VARI-FOCAL RATIO ZOOM LENS SYSTEM

[75] Inventor: Takanori Yamanashi, Kokubunji, Japan

[73] Assignee: Olympus Optical Co., Ltd., Tokyo, Japan

[21] Appl. No.: 269,609

[22] Filed: Nov. 10, 1988

[30] Foreign Application Priority Data

Nov. 13, 1987 [JP] Japan .................................. 62-285453

[51] Int. Cl.⁴ .................. G02B 15/14; G02B 13/08
[52] U.S. Cl. ......................... 350/427; 350/432
[58] Field of Search ....................... 350/432–435, 350/423, 427

[56] References Cited

U.S. PATENT DOCUMENTS 4,701,033 10/1987 Masumoto ................ 350/423 X
4,726,668 2/1988 Nakayama et al. ........... 350/427
4,773,744 9/1988 Yamanashi ................. 350/427

FOREIGN PATENT DOCUMENTS

57-201213 12/1982 Japan .
58-137813  8/1983 Japan .
60-57814   4/1985 Japan .
63-43115   2/1988 Japan .

Primary Examiner—Bruce Y. Arnold
Assistant Examiner—Scott J. Sugarman
Attorney, Agent, or Firm—Cushman, Darby & Cushman

[57] ABSTRACT

A compact high vari-focal lens system permitting simplifying the lens barrel structure and having favorable performance; comprising a first lens group having positive refractive power, a second lens group having positive refractive power and a third lens group having negative refractive power, and so adapted as to perform zooming by shifting the first lens group integrally with the third lens group and shifting the second lens group.

2 Claims, 10 Drawing Sheets

WIDE POSITION

INTERMEDIATE FOCAL LENGTH

TELE POSITION

FIG. 17 ns have short back focal lengths at the wide position, some of the zoom lens systems have large lens diameters on the image side and are not compact.

COMPACT HIGH VARI-FOCAL RATIO ZOOM LENS SYSTEM

BACKGROUND OF THE INVENTION (a) Field of the invention:
The present invention relates to a compact high vari-focal ratio zoom lens system to be attached to lens shutter cameras, etc.

(b) Description of the prior art:
In the recent years where cameras are increasingly fully automated, vari-focal lens systems are adopted in the photographic lens systems used in the so-called lens shutter cameras featuring portability. Under this circumstance, it is necessary to develop a compact zoom lens system.

Since a lens system to be attached to the lens shutter camera does not require a specific back focal length unlike a lens system for the single-lens reflex camera, the former lens system can be made compact by shortening its back focal length. For this purpose, it is preferable to compose a lens system, in the order from the object side, of a lens group having positive refractive power and a lens group having negative refractive power. There have already been designed, for example, compact quasi-wide angle single focal length lens systems and dual-focal lengths switching vari-focal lens systems.

As for zoom lens systems for use with the lens shutter cameras, there have been proposed the zoom lens system composed, in the order from the object side, of a lens group having positive refractive power and a lens group having negative refractive power, as well as the zoom lens system comprising three lens groups designed by developing the zoom lens system comprising two lens groups and the zoom lens system comprising four lens groups.

The zoom lens system disclosed by Japanese Unexamined Published Patent Application No. 201213/57, for example, is composed, in the order from the object side of a first lens group having positive refractive power and a second lens group having negative refractive power.

Further, the zoom lens system disclosed by Japanese Unexamined Published Patent Application No. 137813/58 is so designed as to comprise three lens groups by dividing either of the first or second lens groups of the lens system composed of two lens groups into two lens groups.

The zoom lens system disclosed by Japanese Unexamined Published Patent Application No. 57814/60 comprises four lens groups one of which is kept fixed during zooming together with a fixed stop.

The conventional zoom lens systems mentioned above are used with the lens shutter cameras, video cameras, etc., and designed for obtaining compact lens systems with no consideration to reserve definite back focal lengths unlike the case of the conventional lens systems for the single-lens reflex cameras.

However, all of the above-mentioned zoom lens systems have vari-focal ratios on the order of 1.5 to 2 and are insufficient for making use of perspective variations or obtaining the inherent in the telephoto lens system effect. Further, since the zoom lens systems are of the telephoto type having the lens composition of positive-negative refractive power distribution in the order from the object side, it is easy to shorten total lengths of the zoom lens systems. However, since the zoom lens sys-

SUMMARY OF THE INVENTION

A primary object of the present invention is to provide a compact zoom lens system designed for a high vari-focal ratio, having favorable performance, permitting simplifying the lens barrel structure such as the zooming mechanism and comprising three lens groups.

The zoom lens system according to the present invention comprises, in the order from the object side, a first lens group having positive refractive power, a second lens group having positive refractive power and a third lens group having negative refractive power, and is so adapted as to perform variation of focal length by shifting the first lens group and the third lens group integrally along the optical axis, and displacing the second lens group in conjunction with the shift of the first lens group and the third lens group. Further, the zoom lens system according to the present invention is characterized in that it is so designed as to satisfy the following conditions (1), (2) and (3):

$$0.2 < \phi_1/\phi_W < 0.9 \tag{1}$$

$$1.1 < \phi_{12W}/\phi_W < 1.9 \tag{2}$$

$$1.5 < \beta_{3T}/\beta_{3W} < 2.8 \tag{3}$$

wherein the reference symbol $\phi_W$ represents refractive power of the zoom lens system as a whole at the wide position, the reference symbol $\phi_1$ designates refractive power of the first lens group, the reference symbol $\phi_{12W}$ denotes total refractive power of the first lens group and the second lens group at the wide position, the reference symbol $\beta_{3W}$ represents lateral magnification of the third lens group at the wide position, and the reference symbol $\beta_{3T}$ designates lateral magnification of the third lens group at the tele position.

Figure 1:
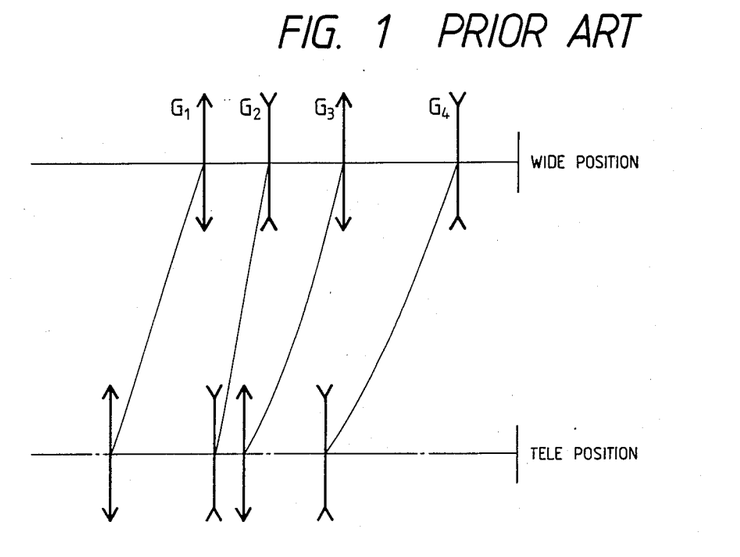
FIG. 1 shows a diagram illustrating the shifting conditions of the respective lens groups in the conventional zoom lens system.

The zoom lens system according to the present invention is designed on the basis of the conventional zoom lens system comprising four lens groups shown in FIG. 1. The zoom lens system shown in FIG. 1 comprises, in the order from the object side, a first lens group $G_1$ having positive refractive power, a second lens group $G_2$ having negative refractive power, a third lens group $G_3$ having positive refractive power and a fourth lens group $G_4$ having negative refractive power, and is so designed as to perform zooming from the wide position to the tele position by shifting each of the lens groups toward the object side as shown in the drawing.

The zoom lens system according to the present invention is designed as a high vari-focal ratio zoom lens system by designing the second lens group $G_2$ having negative refractive power and the third lens group $G_3$ having positive refractive power of the zoom lens system shown in FIG. 1 as a single lens group having positive refractive power and correcting aberrations sufficiently favorably so as to obtain a vari-focal ratio of approximately 3. That is to say, the zoom lens system according to the present invention is composed, in the order from the object side, a first lens group $G_1$ having positive refractive power, a second lens group $G_2$ having positive refractive power and a third lens group $G_3$ having negative refractive power.

In view of the fact that the difference between the shifting distance of the first lens group and that of the third lens group is small when a zoom lens system is composed of three lens groups and they are shifted independently for zooming, the zoom lens system according to the present invention is so designed as to shift the first and third lens groups integrally.

In the case where the first lens group and the third lens group are shifted integrally for zooming, telephoto ratio can be minimized at the tele position, but image plane may be degraded and quality may be degraded in the vicinity of the image center. The zoom lens system according to the present invention corrects these degradations by selecting an adequate composition.

Figure 2:
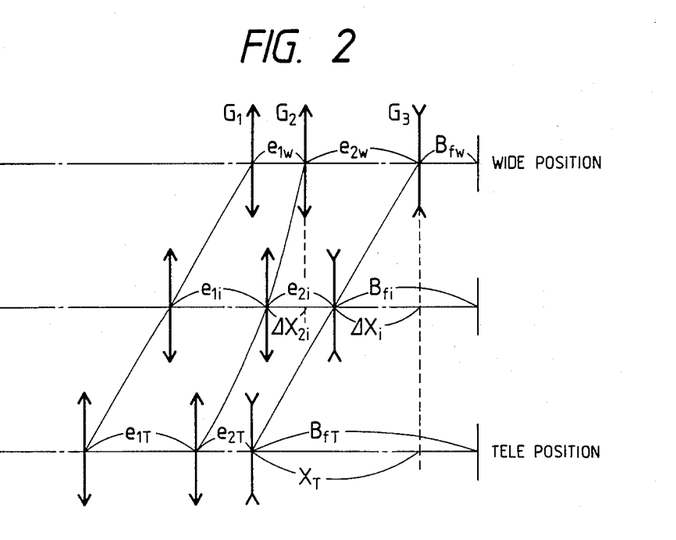
FIG. 2 shows a diagram illustrating shifting conditions of respective lens groups in the zoom lens system according to the present invention.

The zoom lens system according to the present invention has been made short in its total length and compact by designing the first lens group $G_1$ and the second lens group $G_2$ so as to have positive refractive power as a whole as shown in FIG. 2, regarding these lens groups as one positive lens group, and composing a telephoto type lens system of this positive lens group and the succeeding third lens group having negative refractive power.

Further, by designing the second lens group and the third lens group shown in FIG. 1 as a single lens group i.e., the second lens group of the zoom lens system according to the present invention, it is possible to compose the second lens group of the zoom lens system according to the present invention of lens components in a number smaller than that of lens components arranged in the second and third lens groups of the zoom lens system shown in FIG. 1.

Furthermore, the zoom lens system according to the present invention is so designed as to have a high vari-focal ratio, while being made compact at the wide position, by sharing the function of magnification between the second lens group and the third lens group, and characterized especially in that a large share of magnification is given to the third lens group.

When the magnification shares of the vari-focal lens groups are increased to obtain a high vari-focal ratio, shift distances for the lens groups are prolonged for zooming from the wide position to the tele position. In the conventional zoom lens system comprising three lens groups, it is general to shift the three lens groups independently for zooming.

Accordingly, the conventional zoom lens system requires three cams as the zooming mechanisms when shift distances for the lens groups are prolonged, and poses the following problems (a) through (d):

(a) The zooming cams are remarkably inclined and produce unstable lens shifting torques.

(b) Strength of the zooming cam is lowered.

(c) The lens system is brought out of focus due to rattling of the cams for the lens groups during zooming.

(d) Image quality of remarkably influenced by accentricity of the lens groups.

Therefore, manufacturing errors remarkably influence on image quality, etc., thereby resulting in degradation of image quality. It is therefore effective to shift the first lens group $G_1$ and the third lens group $G_3$ integrally for zooming.

In view of these facts, the composition described above has been selected for the zoom lens system according to the present invention. Moreover, it is important to select an adequate refractive power distribution among the lens groups for accomplishing the object of the present invention, and the zoom lens system according to the present invention is so designed as to satisfy the above-mentioned conditions (1), (2) and (3).

The condition (1) defines refractive power of the first lens group of the zoom lens system according to the present invention. In the lens system according to the present invention, it can be regarded that the second lens group and the third lens group compose a vari-focal system and the first lens group is disposed in front of the vari-focal system in order to enlarge the vari-focal ratio of the lens system. The condition (1) defines the share of magnification to be given to the second lens group and shift distance of the second lens group for zooming for the purpose of favorable correction of aberrations.

If $\phi_1/\phi_W$ exceeds the upper limit of the condition (1), it will be advantageous for shortening total length of the lens system at the wide position, but such a ratio of refractive powers will remarkably shorten back focal length of the lens system and undesirably enlarge outside diameter of the third lens group. This will be more remarkable when the focal length becomes shorter at the wide position. Further, Petzval's sum will be overcorrected, flatness of the image plane will be degraded and lateral chromatic aberration will undesirably be aggravated. If $\phi_1/\phi_W$ is smaller than the lower limit of the condition (1), in contrast, it will be advantageous for correcting aberrations, but such a ratio of refractive powers will make it difficult to shorten total length of the lens system.

If the condition (1) is not satisfied as described above, it will be difficult to correct aberrations favorably when the first lens group and the third lens groups are shifted integrally. The condition (2) defines total refractive power of the first lens group and the second lens group. When the condition (1) is satisfied, the second condition (2) is important to determine refractive power of the second lens group so as to make the lens system compact at the wide position.

If $\phi_{12W}/1_W$ exceeds the upper limit of the condition (2), it will be effective to shorten total length of the lens system at the wide position, but Petzval's sum will be overcorrected, flatness of the image plane will be degraded and lateral chromatic aberration will be aggravated, thereby making it difficult to correct aberrations remaining in the second lens group by the third lens group and making it impossible to obtain good image quality.

If $\phi_{12W}/\phi_W$ is smaller than the lower limit of the condition (2), it will be advantageous for correcting aberrations, but such a ratio of refractive powers will make it difficult to shorten total length of the lens system at the wide position and weaken refractive power of the third lens group, thereby locating the rear principal plane into the lens system, shortening back focal length of the lens system and enlarging diameter of the lens system.

The condition (3) defines the share of lateral magnification to be given to the third lens group for obtaining the desired vari-focal ratio of the zoom lens system.

If the upper limit of the condition (3) is exceeded, the share of magnification given to the third lens group for zooming will be remarkably increased and shifting distance for zooming will be prolonged. Accordingly, variable magnification ratio of the second lens group becomes very low, thereby losing the significance of the design that the zoom lens system is composed of three lens groups. Further, the lens groups will be brought close to one another at the tele position, the spherical aberration of higher order will be too remarkable to be corrected, and the lens system will have a long total length since the first lens group and the third lens group are shifted integrally.

If the lower limit of the condition (3) is exceeded, it will be necessary to increase the share of variable magnification ratio to be given to the second lens group, and adopt a zooming system wherein the second lens group is shifted for zooming toward the image side taking the wide position as standard with a long distance reserved between the second lens group and the third lens group along the optical axis, thereby making it difficult to shorten total length of the zoom lens system.

When magnification of the third lens group is determined, the share of lateral magnification to be given to the second lens group is, as seen from FIG. 2, determined by the following equations:

$$\frac{1}{\phi} = \beta_2 \cdot \beta_3 \cdot \frac{1}{\phi_1} \quad (i)$$

$$\beta_2^2 + K \cdot \beta_2 + 1 = 0 \quad (ii)$$

$$K = \phi_2 \left\{ -\frac{1}{\phi_3} \left( 1 - \frac{1}{\beta_3} \right) - \frac{1}{\phi_1} - \frac{2}{\phi_2} + L \right\} \quad (iii)$$

$$L = e_1 + e_2 \quad (iv)$$

wherein the reference symbols $\phi_1$, $\phi_2$ and $\phi_3$ represent refractive powers of the first lens group, the second lens group and the third lens group respectively, the reference symbol $e_1$ designates distance between the principal points of the first lens group and the second lens group, and the reference symbol $e_2$ denotes distance between the principal points of the second lens group and the third lens group.

Figure 3:
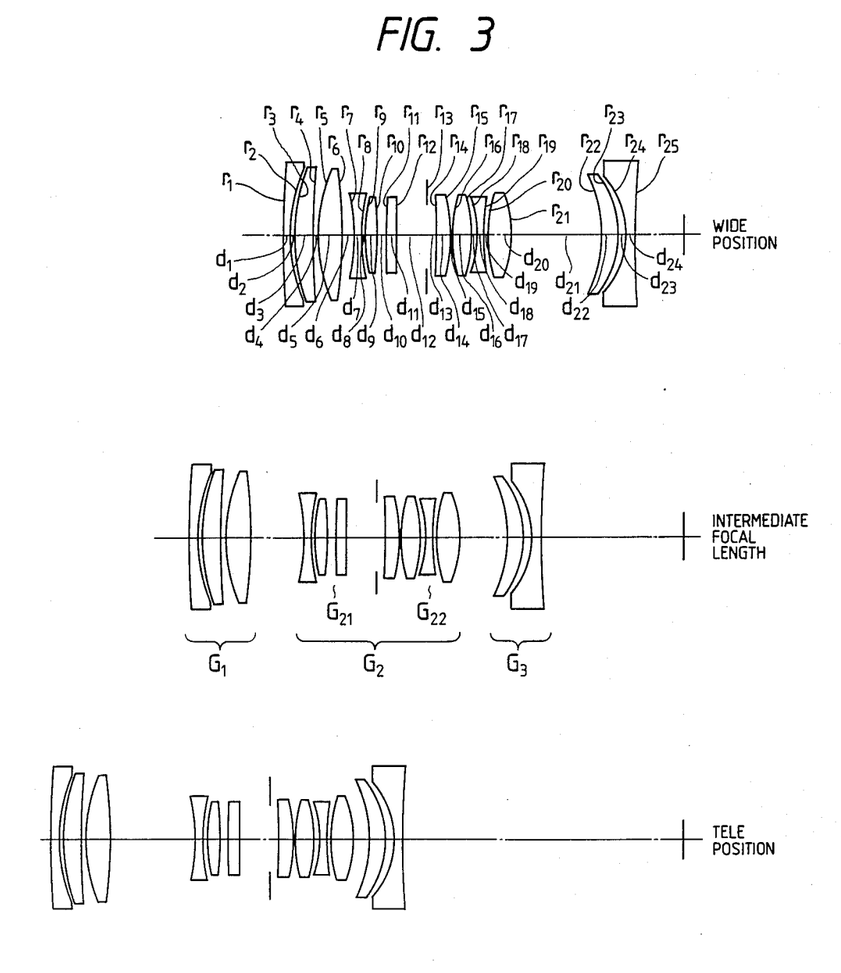
FIG. 3 shows a sectional view illustrating composition of the zoom lens system according to the present invention.

The object of the present invention can be accomplished by designing a zoom lens system so as to satisfy the conditions described above. As is understood from the foregoing description, the zoom lens system according to the present invention is characterized in that the first lens group having positive refractive power and the third lens group having negative refractive power are shifted integrally for zooming, and that the zoom lens system is so designed as to satisfy the conditions (1), (2) and (3). In order to obtain good image quality over the entire vari-focal range, it is preferable to select the following compositions for the lens groups respectively. That is to say, it is preferable to compose the zoom lens system as shown in FIG. 3 wherein the first lens group $G_1$ comprises at least one negative lens component and at least one positive lens component, the second lens group $G_2$ is composed of a front subgroup comprising at least one negative lens component and at least one positive lens component, and a rear subgroup comprising at least two positive lens components and at least one negative lens component, and the third lens group $G_3$ comprises at least one positive lens component and at least one negative lens component.

In order to obtain a higher vari-focal ratio and better image quality with the zoom lens system according to the present invention, it is effective to use an aspherical lens component. Especially, use of an aspherical lens component is effective for correcting spherical aberration of higher order in the vicinity of the tele position. Speaking more concretely, it is possible to improve image quality by using aspherical lens component in some of the three lens groups so as to lessen the burden of the lens component having refractive power stronger than required or weaken the refractive power of the lens component.

When the direction of the optical axis is taken as the x axis, the direction perpendicular to the optical axis is taken as the y axis and radius of curvature at the vertex of the aspherical surface is represented by $r_k$, shape of an aspherical surface is expressed by the following formula:

$$x_k = \frac{y_k^2}{r_k + r_k \sqrt{1 - (y_k/r_k)^2}} + A_k y_k^4 + B_k y_k^2 + C_k y_k^8 + D_k y_k^{10}$$

wherein the reference symbols $A_k$, $B_k$, $C_k$ and $D_k$ represent coefficients of aspherical surface, and the reference symbol k indicates that the spherical surface is the k'th surface in the zoom lens system.

DETAILED DESCRIPTION OF THE PREFERRED EMBODIMENTS

Now, the preferred embodiments of the zoom lens system according to the present invention will be described in the form of numerical data:

Embodiment 1 f = 39.4 — 101.3,  F/4.66 — F/6.4

| | | |
|---|---|---|
| $r_1 = 252.8890$ | | |
| | $d_1 = 1.1000$ | $n_1 = 1.83400$  $\nu_1 = 37.16$ |
| $r_2 = 30.1004$ | | |
| | $d_2 = 1.1929$ | |
| $r_3 = 41.0726$ | | |
| | $d_3 = 3.7550$ | $n_2 = 1.60300$  $\nu_2 = 65.48$ |
| $r_4 = 164.0961$ | | |
| | $d_4 = 0.8152$ | |

-continued

| | | | |
|---|---|---|---|
| $r_5 = 28.8830$ | | | |
| | $d_5 = 5.0221$ | $n_3 = 1.55232$ | $\nu_3 = 63.75$ |
| $r_6 = -84.7169$ | | | |
| | $d_6 = l_1$ (variable) | | |
| $r_7 = -31.0336$ | | | |
| | $d_7 = 1.4108$ | $n_4 = 1.77250$ | $\nu_4 = 49.66$ |
| $r_8 = 27.5058$ | | | |
| | $d_8 = 0.7541$ | | |
| $r_9 = 33.4838$ | | | |
| | $d_9 = 2.4277$ | $n_5 = 1.80518$ | $\nu_5 = 25.43$ |
| $r_{10} = -139.2822$ | | | |
| | $d_{10} = 2.0001$ | | |
| $r_{11} = 685.4571$ (aspherical surface) | | | |
| | $d_{11} = 1.9357$ | $n_6 = 1.49216$ | $\nu_6 = 57.50$ |
| $r_{12} = 589.1345$ | | | |
| | $d_{12} = 4.7095$ | | |
| $r_{13} = \infty$ (stop) | | | |
| | $d_{13} = 3.6127$ | | |
| $r_{14} = -158.6518$ | | | |
| | $d_{14} = 2.8708$ | $n_7 = 1.64769$ | $\nu_7 = 33.80$ |
| $r_{15} = -33.5211$ | | | |
| | $d_{15} = 0.5884$ | | |
| $r_{16} = 33.9317$ | | | |
| | $d_{16} = 3.6336$ | $n_8 = 1.61484$ | $\nu_8 = 51.17$ |
| $r_{17} = -34.1950$ | | | |
| | $d_{17} = 1.1673$ | | |
| $r_{18} = -21.7035$ | | | |
| | $d_{18} = 1.5578$ | $n_9 = 1.74000$ | $\nu_9 = 28.29$ |
| $r_{19} = 29.3148$ | | | |
| | $d_{19} = 0.8678$ | | |
| $r_{20} = 38.8101$ | | | |
| | $d_{20} = 4.4137$ | $n_{10} = 1.60311$ | $\nu_{10} = 60.70$ |
| $r_{21} = -20.8925$ | | | |
| | $d_{21} = l_2$ (variable) | | |
| $r_{22} = -28.5281$ | | | |
| | $d_{22} = 3.6141$ | $n_{11} = 1.78470$ | $\nu_{11} = 26.22$ |
| $r_{23} = -17.7328$ | | | |
| | $d_{23} = 1.7611$ | | |
| $r_{24} = -17.0380$ | | | |
| | $d_{24} = 1.8000$ | $n_{12} = 1.77250$ | $\nu_{12} = 49.66$ |
| $r_{25} = 156.7633$ | | | |
| f | 39.4 | 63.0 | 101.3 |
| $l_1$ | 2.624 | 10.914 | 17.295 |
| $l_2$ | 17.944 | 9.655 | 3.274 | aspherical coefficient
$A_{11} = 0.15997 \times 10^{-6}$, $B_{11} = 0.33793 \times 10^{-7}$,
$C_{11} = -0.37304 \times 10^{-9}$, $D_{11} = -0.26812 \times 10^{-11}$
$\phi_1/\phi_W = 0.547$, $\phi_{12W}/\phi_W = 1.372$
$\beta_{3T}/\beta_{3W} = 2.09226$

| | Embodiment 2 | | |
|---|---|---|---|
| | $f = 39.4 - 101.3$, | F/4.66 - F/6.4 | |
| $r_1 = 253.2521$ | | | |
| | $d_1 = 1.3000$ | $n_1 = 1.83400$ | $\nu_1 = 37.16$ |
| $r_2 = 30.0031$ | | | |
| | $d_2 = 1.1496$ | | |
| $r_3 = 39.9451$ | | | |
| | $d_3 = 3.7019$ | $n_2 = 1.61800$ | $\nu_2 = 63.38$ |
| $r_4 = 158.5374$ | | | |
| | $d_4 = 0.5624$ | | |
| $r_5 = 28.6880$ | | | |
| | $d_5 = 5.0515$ | $n_3 = 1.54771$ | $\nu_3 = 62.83$ |
| $r_6 = -87.2809$ | | | |
| | $d_6 = l_1$ (variable) | | |
| $r_7 = -31.6880$ | | | |
| | $d_7 = 1.4730$ | $n_4 = 1.77250$ | $\nu_4 = 49.66$ |
| $r_8 = 25.9508$ | | | |
| | $d_8 = 0.7685$ | | |
| $r_9 = 33.7653$ (aspherical surface) | | | |
| | $d_9 = 2.4276$ | $n_5 = 1.80518$ | $\nu_5 = 25.43$ |
| $r_{10} = -162.8684$ | | | |
| | $d_{10} = 1.9938$ | | |
| $r_{11} = 590.5099$ | | | |
| | $d_{11} = 1.9326$ | $n_6 = 1.49216$ | $\nu_6 = 57.50$ |
| $r_{12} = 626.9900$ | | | |
| | $d_{12} = 4.7004$ | | |
| $r_{13} = \infty$ (stop) | | | |
| | $d_{13} = 3.5763$ | | |
| $r_{14} = -261.7556$ | | | |
| | $d_{14} = 2.8464$ | $n_7 = 1.64769$ | $\nu_7 = 33.80$ |
| $r_{15} = -32.8600$ | | | |
| | $d_{15} = 0.4572$ | | |
| $r_{16} = 36.3861$ | | | |

-continued

| | $d_{16} = 4.4576$ | $n_8 = 1.61484$ | $\nu_8 = 51.17$ |
|---|---|---|---|
| $r_{17} = -35.1234$ | $d_{17} = 1.1261$ | | |
| $r_{18} = -22.1084$ | $d_{18} = 1.5527$ | $n_9 = 1.74000$ | $\nu_9 = 28.29$ |
| $r_{19} = 29.9068$ | $d_{19} = 0.8640$ | | |
| $r_{20} = 39.9720$ | $d_{20} = 4.3460$ | $n_{10} = 1.60300$ | $\nu_{10} = 65.48$ |
| $r_{21} = -20.6703$ | $d_{21} = l_2$ (variable) | | |
| $r_{22} = -29.7725$ | $d_{22} = 3.8438$ | $n_{11} = 1.78470$ | $\nu_{11} = 26.22$ |
| $r_{23} = -17.8475$ | $d_{23} = 1.7044$ | | |
| $r_{24} = -17.0271$ | $d_{24} = 2.0000$ | $n_{12} = 1.77250$ | $\nu_{12} = 49.66$ |
| $r_{25} = 137.0348$ | | | |
| f | 39.4 | 63.0 | 101.3 |
| $l_1$ | 2.666 | 10.936 | 17.317 |
| $l_2$ | 17.925 | 9.655 | 3.274 | aspherical coefficient
$A_9 = 0.50346 \times 10^{-7}$, $B_9 = 0.77315 \times 10^{-8}$
$C_9 = -0.20280 \times 10^{-10}$, $D_9 = -0.37090 \times 10^{-11}$
$\phi_1/\phi_W = 0.548$, $\phi_{12W}/\phi_W = 1.374$
$\beta_{3T}/\beta_{3W} = 2.09226$ Embodiment 3
$f = 39.31 - 101.13$, F/4.5 — F/6.28

| | | | |
|---|---|---|---|
| $r_1 = 513.3560$ | $d_1 = 1.6500$ | $n_1 = 1.85540$ | $\nu_1 = 36.60$ |
| $r_2 = 31.7925$ | $d_2 = 1.1000$ | | |
| $r_3 = 44.9038$ | $d_3 = 3.4800$ | $n_2 = 1.61272$ | $\nu_2 = 58.75$ |
| $r_4 = 731.3631$ | $d_4 = 0.2000$ | | |
| $r_5 = 27.9426$ | $d_5 = 5.1985$ | $n_3 = 1.56873$ | $\nu_3 = 63.16$ |
| $r_6 = -101.7828$ | $d_6 = l_1$ (variable) | | |
| $r_7 = -33.1022$ | $d_7 = 11.6000$ | $n_4 = 1.78590$ | $\nu_4 = 44.18$ |
| $r_8 = 24.2951$ | $d_8 = 0.6406$ | | |
| $r_9 = 30.1943$ (aspherical surface) | $d_9 = 2.6079$ | $n_5 = 1.78472$ | $\nu_5 = 25.68$ |
| $r_{10} = -66.5863$ | $d_{10} = 1.9802$ | | |
| $r_{11} = -40.2110$ | $d_{11} = 2.0000$ | $n_6 = 1.69100$ | $\nu_6 = 54.84$ |
| $r_{12} = -59.9299$ | $d_{12} = 4.5307$ | | |
| $r_{13} = \infty$ (stop) | $d_{13} = 3.6596$ | | |
| $r_{14} = -120.2869$ | $d_{14} = 2.8357$ | $n_7 = 1.65128$ | $\nu_7 = 38.25$ |
| $r_{15} = -30.0080$ | $d_{15} = 0.3311$ | | |
| $r_{16} = 36.7943$ | $d_{16} = 3.9213$ | $n_8 = 1.61484$ | $\nu_8 = 51.17$ |
| $r_{17} = -32.7555$ | $d_{17} = 1.0764$ | | |
| $r_{18} = -20.3083$ | $d_{18} = 1.5365$ | $n_9 = 1.74000$ | $\nu_9 = 28.29$ |
| $r_{19} = 30.6552$ | $d_{19} = 1.0875$ | | |
| $r_{20} = 38.7742$ | $d_{20} = 4.0885$ | $n_{10} = 1.61272$ | $\nu_{10} = 58.75$ |
| $r_{21} = -20.4332$ | $d_{21} = l_2$ (variable) | | |
| $r_{22} = -31.3185$ (aspherical surface) | $d_{22} = 3.6788$ | $n_{11} = 1.78472$ | $\nu_{11} = 25.68$ |
| $r_{23} \, l = -18.1810$ | $d_{23} = 1.6503$ | | |
| $r_{24} = -16.2922$ | $d_{24} = 1.7821$ | $n_{12} = 1.77250$ | $\nu_{12} = 49.66$ |
| $r_{25} = 125.1181$ | | | |
| f | 39.31 | 62.88 | 101.13 |
| $l_1$ | 2.789 | 10.625 | 16.760 |
| $l_2$ | 16.795 | 8.959 | 2.824 | aspherical coefficient
$A_9 = 0.22698 \times 10^{-5}$, $B_9 = 0.63356 \times 10^{-8}$, -continued $C_9 = 0.57551 \times 10^{-9}$, $D_9 = -0.14016 \times 10^{-10}$
$A_{22} = 0.51371 \times 10^{-5}$
$B_{22} = 0.25597 \times 10^{-7}$, $C_{22} = -0.18476 \times 10^{-9}$,
$D_{22} = 0.91085 \times 10^{-12}$
$\phi_1/\phi_W = 0.592$, $\phi_{12W}/\phi_W = 1.39$
$\beta_{3T}/\beta_{3W} = 2.07345$ Embodiment 4

$f = 39.4 - 101.3$, F/4.66 − F/6.4

| | | | |
|---|---|---|---|
| $r_1 = 404.6410$ | | | |
| | $d_1 = 2.7999$ | $n_1 = 1.83400$ | $\nu_1 = 37.16$ |
| $r_2 = 41.5187$ | | | |
| | $d_2 = 1.3715$ | | |
| $r_3 = 36.1660$ | | | |
| | $d_3 = 5.0772$ | $n_2 = 1.62280$ | $\nu_2 = 57.06$ |
| $r_4 = 1366.5271$ | | | |
| | $d_4 = 0.3388$ | | |
| $r_5 = 62.8709$ | | | |
| | $d_5 = 5.0000$ | $n_3 = 1.55671$ | $\nu_3 = 58.68$ |
| $r_6 = -456.8038$ | | | |
| | $d_6 = l_1$ (variable) | | |
| $r_7 = -45.8939$ | | | |
| | $d_7 = 1.4100$ | $n_4 = 1.77250$ | $\nu_4 = 49.66$ |
| $r_8 = 80.5297$ | | | |
| | $d_8 = 0.7500$ | | |
| $r_9 = 112.9766$ | | | |
| | $d_9 = 2.4200$ | $n_5 = 1.80518$ | $\nu_5 = 25.43$ |
| $r_{10} = -45.9472$ | | | |
| | $d_{10} = 2.0000$ | | |
| $r_{11} = -38.7877$ (aspherical surface) | | | |
| | $d_{11} = 1.9400$ | $n_6 = 1.58313$ | $\nu_6 = 59.36$ |
| $r_{12} = 140.5472$ | | | |
| | $d_{12} = 4.7000$ | | |
| $r_{13} = \infty$ (stop) | | | |
| | $d_{13} = 3.6100$ | | |
| $r_{14} = -28.5955$ | | | |
| | $d_{14} = 2.8700$ | $n_7 = 1.63930$ | $\nu_7 = 44.88$ |
| $r_{15} = -16.4853$ (aspherical surface) | | | |
| | $d_{15} = 0.3000$ | | |
| $r_{16} = 30.4574$ | | | |
| | $d_{16} = 3.6300$ | $n_8 = 1.61484$ | $\nu_8 = 51.17$ |
| $r_{17} = -30.9649$ | | | |
| | $d_{17} = 0.5110$ | | |
| $r_{18} = -20.6067$ | | | |
| | $d_{18} = 1.5000$ | $n_9 = 1.75520$ | $\nu_9 = 27.51$ |
| $r_{19} = 45.3818$ | | | |
| | $d_{19} = 2.6991$ | | |
| $r_{20} = 97.4791$ | | | |
| | $d_{20} = 4.4000$ | $n_{10} = 1.60311$ | $\nu_{10} = 60.70$ |
| $r_{21} = -21.3811$ | | | |
| | $d_{21} = l_2$ (variable) | | |
| $r_{22} = -43.7538$ | | | |
| | $d_{22} = 3.6100$ | $n_{11} = 1.78472$ | $\nu_{11} = 25.68$ |
| $r_{23} = -23.4657$ | | | |
| | $d_{23} = 1.4222$ | | |
| $r_{24} = -22.6349$ | | | |
| | $d_{24} = 1.8000$ | $n_{12} = 1.69100$ | $\nu_{12} = 54.84$ |
| $r_{25} = 58.4127$ | | | | aspherical coefficient
$A_{11} = -0.23787 \times 10^{-4}$, $B_{11} = -0.23981 \times 10^{-6}$
$C_{11} = 0.69068 \times 10^{-8}$, $D_{11} = -0.95557 \times 10^{-10}$
$A_{15} = 0.17383 \times 10^{-6}$, $B_{15} = 0.56311 \times 10^{-7}$
$C_{15} = -0.17467 \times 10^{-8}$, $D_{15} = 0.96984 \times 10^{-11}$

| f | 39.4 | 63.0 | 101.3 |
|---|---|---|---|
| $l_1$ | 4.0 | 13.787 | 21.503 |
| $l_2$ | 18.258 | 8.471 | 0.755 |

$\phi_1/\phi_W = 0.368$, $\phi_{12W}/\phi_W = 1.293$, $\beta_{3T}/\beta_{3W} = 2.166$ Embodiment 5

$f = 39.4 - 101.3$, F/4.66 − F/6.4

| | | | |
|---|---|---|---|
| $r_1 = -1072.3718$ | | | |
| | $d_1 = 2.7999$ | $n_1 = 1.83400$ | $\nu_1 = 37.16$ |
| $r_2 = 35.7628$ | | | |
| | $d_2 = 1.3715$ | | |
| $r_3 = 39.1536$ | | | |
| | $d_3 = 5.0772$ | $n_2 = 1.60300$ | $\nu_2 = 65.48$ |
| $r_4 = -146.4984$ | | | |
| | $d_4 = 0.3388$ | | |
| $r_5 = 33.6347$ | | | |
| | $d_5 = 5.0000$ | $n_3 = 1.55671$ | $\nu_3 = 58.68$ |
| $r_6 = -145.7942$ | | | |
| | $d_6 = l_1$ (variable) | | |
| $r_7 = -34.4494$ | | | |
| | $d_7 = 1.4100$ | $n_4 = 1.77250$ | $\nu_4 = 49.66$ |

-continued

| | | | |
|---|---|---|---|
| $r_8 = 48.5001$ | | | |
| | $d_8 = 0.7500$ | | |
| $r_9 = 187.8219$ | | | |
| | $d_9 = 2.4200$ | $n_5 = 1.80518$ | $\nu_5 = 25.43$ |
| $r_{10} = -36.4420$ | | | |
| | $d_{10} = 2.0000$ | | |
| $r_{11} = -589.6173$ (aspherical surface) | | | |
| | $d_{11} = 1.9400$ | $n_6 = 1.58313$ | $\nu_6 = 59.36$ |
| $r_{12} = 50.2001$ | | | |
| | $d_{12} = 4.7000$ | | |
| $r_{13} = \infty$ (stop) | | | |
| | $d_{13} = 3.6100$ | | |
| $r_{14} = -26.7986$ | | | |
| | $d_{14} = 2.8700$ | $n_7 = 1.63930$ | $\nu_7 = 44.88$ |
| $r_{15} = -14.1366$ (aspherical surface) | | | |
| | $d_{15} = 0.3000$ | | |
| $r_{16} = 38.6798$ | | | |
| | $d_{16} = 3.6300$ | $n_8 = 1.61484$ | $\nu_8 = 51.17$ |
| $r_{17} = -39.7672$ | | | |
| | $d_{17} = 0.5110$ | | |
| $r_{18} = -17.9337$ | | | |
| | $d_{18} = 1.5000$ | $n_9 = 1.75520$ | $\nu_9 = 27.51$ |
| $r_{19} = 80.2121$ | | | |
| | $d_{19} = 2.6991$ | | |
| $r_{20} = 129.1488$ | | | |
| | $d_{20} = 4.4000$ | $n_{10} = 1.60311$ | $\nu_{10} = 60.70$ |
| $r_{21} = -19.8416$ | | | |
| | $d_{21} = l_2$ (variable) | | |
| $r_{22} = -28.8556$ | | | |
| | $d_{22} = 3.6100$ | $n_{11} = 1.78472$ | $\nu_{11} = 25.68$ |
| $r_{23} = -19.9250$ | | | |
| | $d_{23} = 1.4222$ | | |
| $r_{24} = -20.7038$ | | | |
| | $d_{24} = 1.800$ | $n_{12} = 1.72916$ | $\nu_{12} = 54.68$ |
| $r_{25} = 72.7471$ | | | | aspherical coefficient
$A_{11} = -0.23773 \times 10^{-4}$, $B_{11} = -0.22589 \times 10^{-6}$
$C_{11} = 0.95644 \times 10^{-8}$, $D_{11} = 0.18713 \times 10^{-9}$
$A_{15} = -0.83931 \times 10^{-7}$, $B_{15} = 0.81143 \times 10^{-7}$
$C_{15} = 0.71265 \times 10^{-9}$, $D_{15} = -0.45440 \times 10^{-10}$

| | | | |
|---|---|---|---|
| f | 39.4 | 63.0 | 101.3 |
| $l_1$ | 1.412 | 9.647 | 17.236 |
| $l_2$ | 16.526 | 8.291 | 0.701 |

$\phi_1/\phi_W = 0.69$, $\phi_{12W}/\Phi_W = 1.386$, $\beta_{3T}/\beta_{3W} = 1.915$ wherein the reference symbols $r_1$ through $r_{25}$ represent radii of curvature on the surfaces of respective lens components, the reference symbols $d_1$ through $d_{24}$ designate thicknesses of the respective lens components and airspaces reserved therebetween, the reference symbols $n_1$ through $n_{12}$ denote refractive indices of the respective lens components and the reference symbols $\nu_1$ through $\nu_{12}$ represent Abbe's numbers of the respective lens components.

Each of these Embodiments has the composition illustrated in FIG. 1 and comprises surfaces producing aberrations of high orders in each lens group.

In the Embodiment 1, for example, these surfaces are the second surface $r_2$ and the third surface $r_3$ in the first lens group, the eighth surface $r_8$ and the ninth surface $r_9$ in the front subgroup of the second lens group, and the seventeenth surface $r_{17}$, the eighteenth surface $r_{18}$, the nineteenth surface $r_{19}$ and the twentieth surface $r_{20}$ in the rear subgroup of the second lens group, and the twenty-third surface $r_{23}$ and the twenty-fourth surface $r_{24}$ in the third lens group. These surfaces produce aberrations and have coefficients of aberration of the signs reverse to each other, thereby correcting aberrations delicately so as to favorably correct the curvature of image plane at the wide position, chromatic aberration at the tele position and distortion, etc. which would otherwise be varied in a board range.

When the cam used in the first lens group is integrated with the cam arranged in the third lens group, restrictions are posed on correction of aberrations, and in an attempt to shorten total length of the lens system at the wide position, telephoto ratio cannot be minimized at the tele position and spherical aberration can hardly be corrected. In the Embodiments of the present invention, the above-mentioned aberration is corrected by using aspherical lens components.

The eleventh surface($r_{11}$) is designed as an aspherical surface in the Embodiment 1, the ninth surface ($r_9$)is designed as an aspherical surface in the Embodiment 2, and the ninth and twenty-second surfaces ($r_9$, $r_{22}$) are designed as aspherical surfaces in the Embodiment 3.

Figure 4:
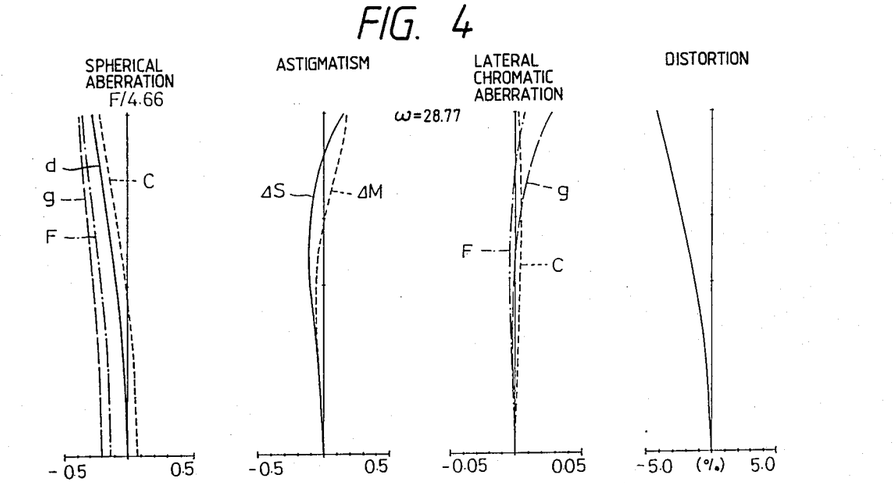
FIG. 4 through FIG. 6 show graphs illustrating aberration characteristics of Embodiment 1 of the zoom lens system according to the present invention.
Figure 5:
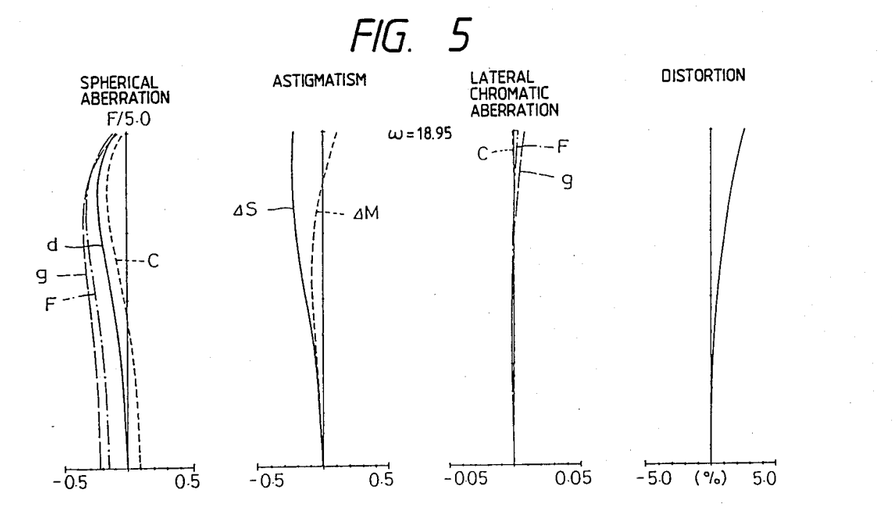
Figure 6:
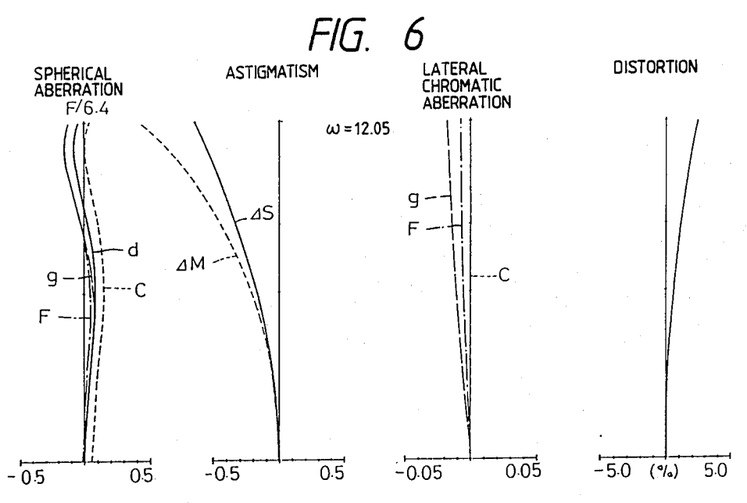
Figure 7:
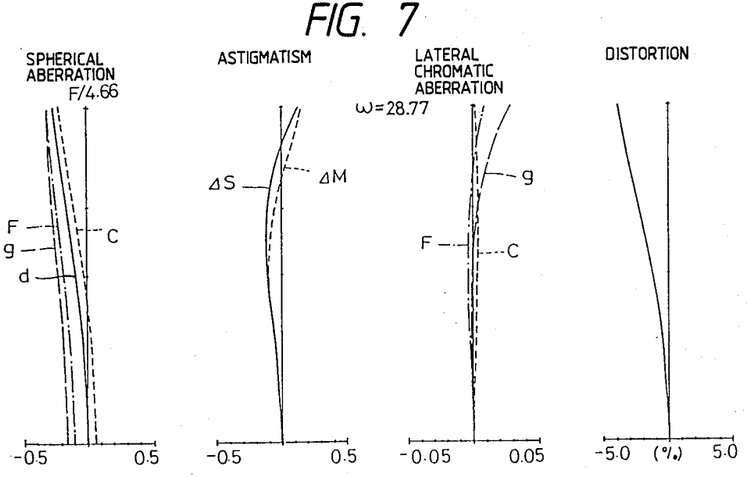
FIG. 7 through FIG. 9 show graphs illustrating aberration characteristics of Embodiment 2 of the zoom lens system according to the present invention.
Figure 8:
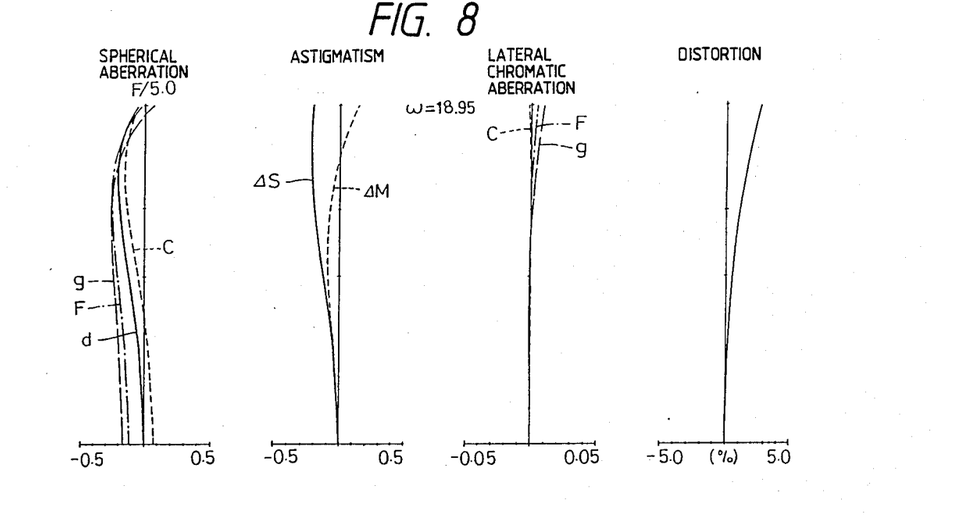
Figure 9:
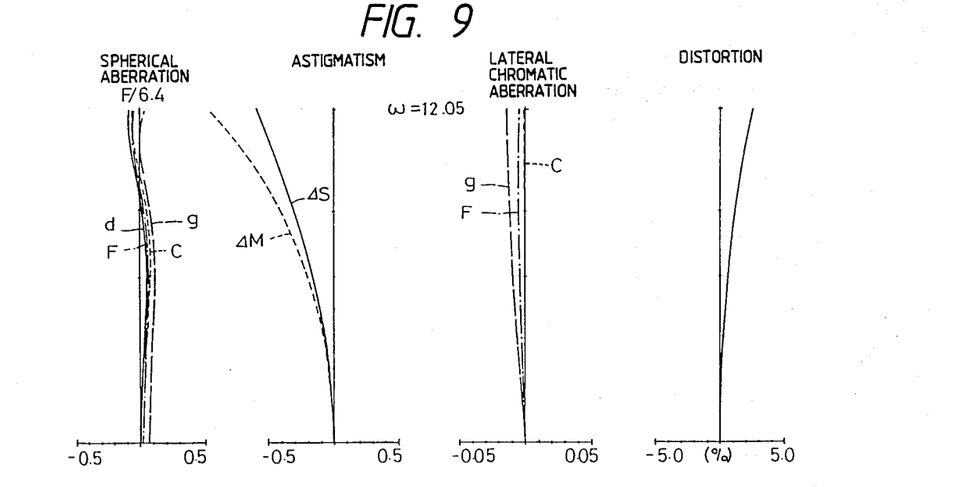
Figure 10:
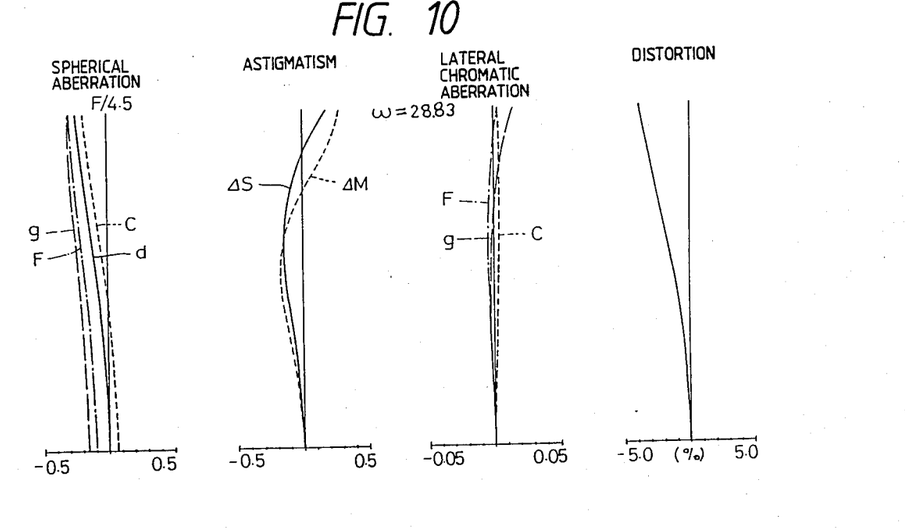
FIG. 10 through FIG. 12 show graphs illustrating aberration characteristics of Embodiment 3 of the zoom lens system according to the present invention.
Figure 11:
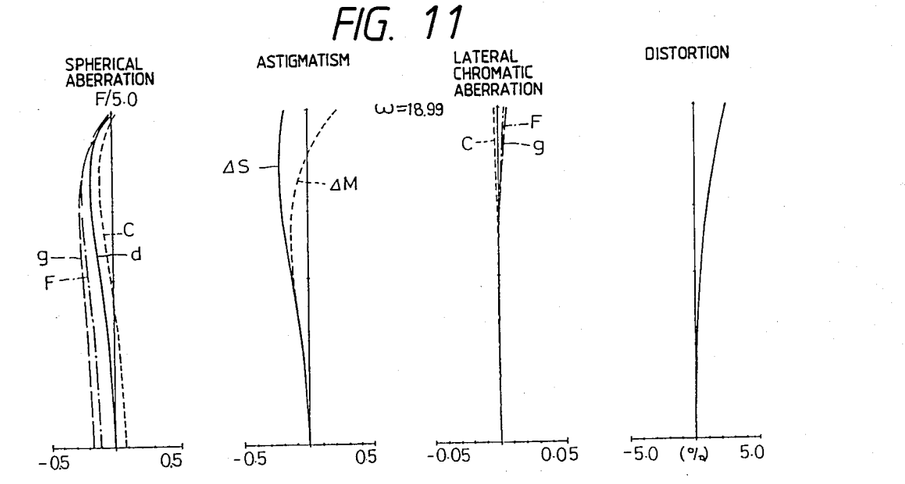
Figure 12:
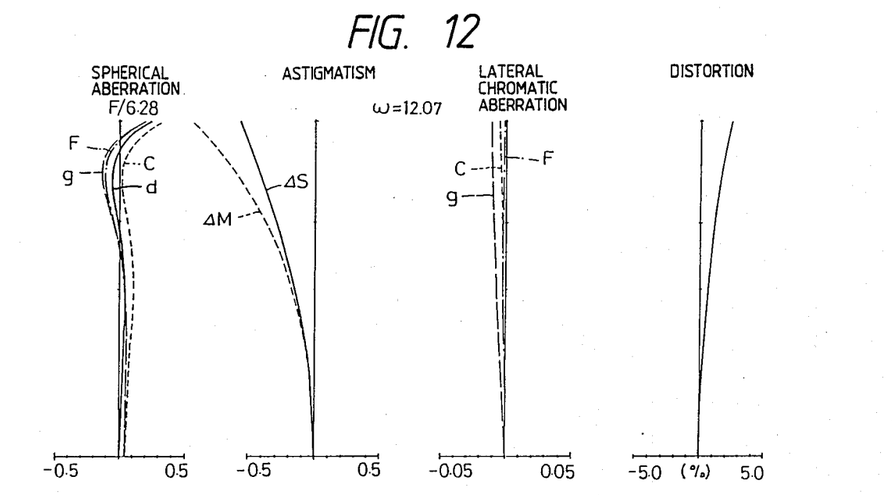
Figure 13:
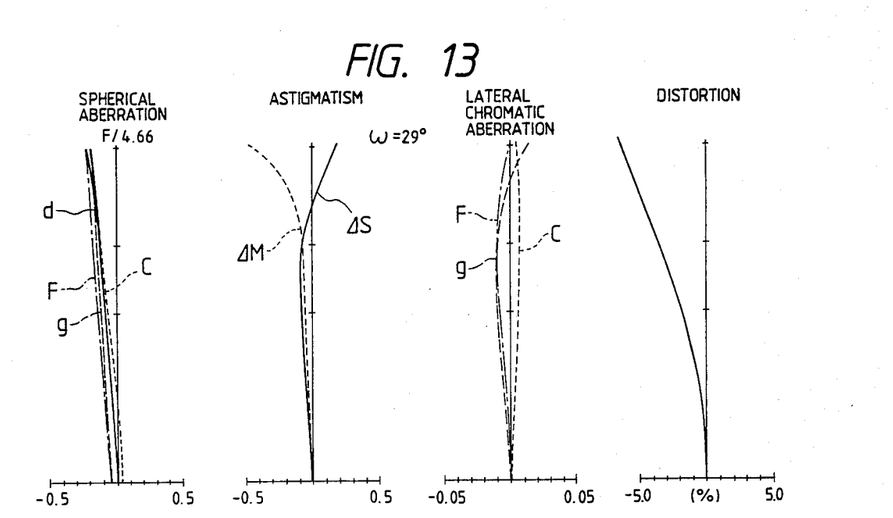
FIG. 13 through FIG. 15 show graphs illustrating aberration characteristics of Embodiment 4 of the zoom lens system according to the present invention.
Figure 14:
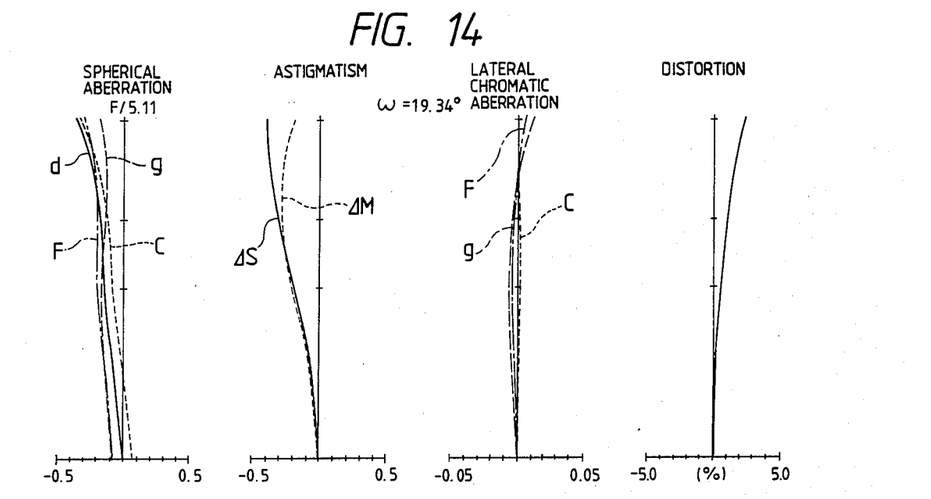
Figure 15:
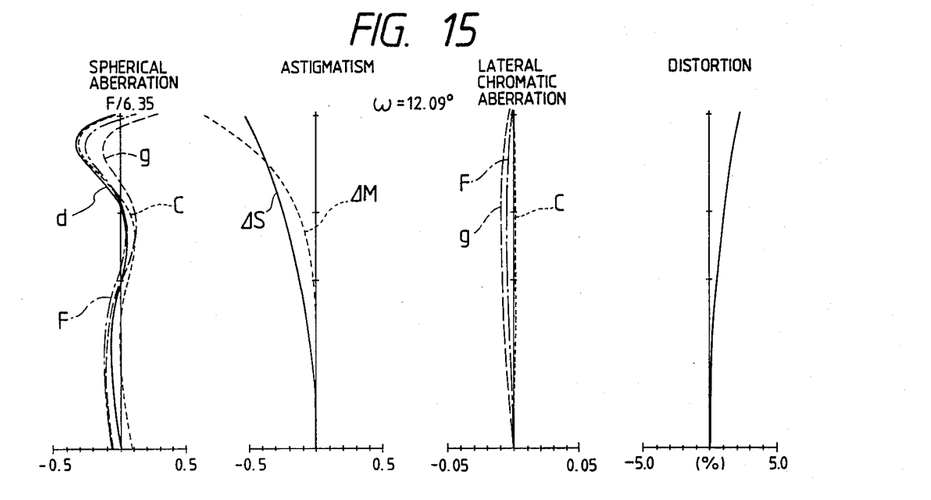
Figure 16:
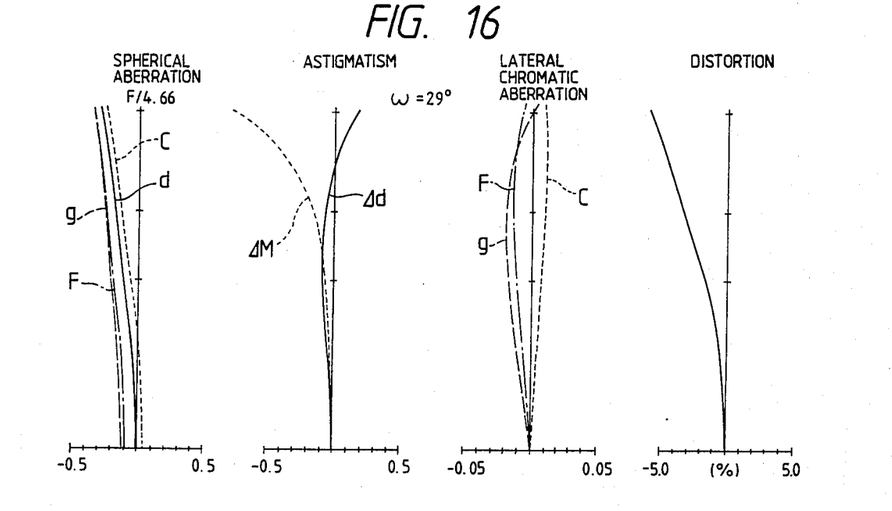
FIG. 16 through FIG. 18 show graphs illustrating aberration characteristics of Embodiment 5 of the zoom lens system according to the present invention.
Figure 17:
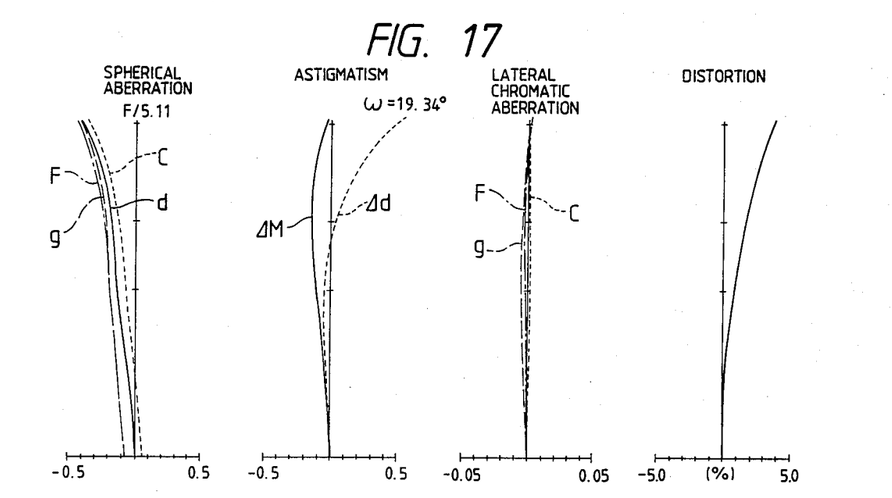
Figure 18:
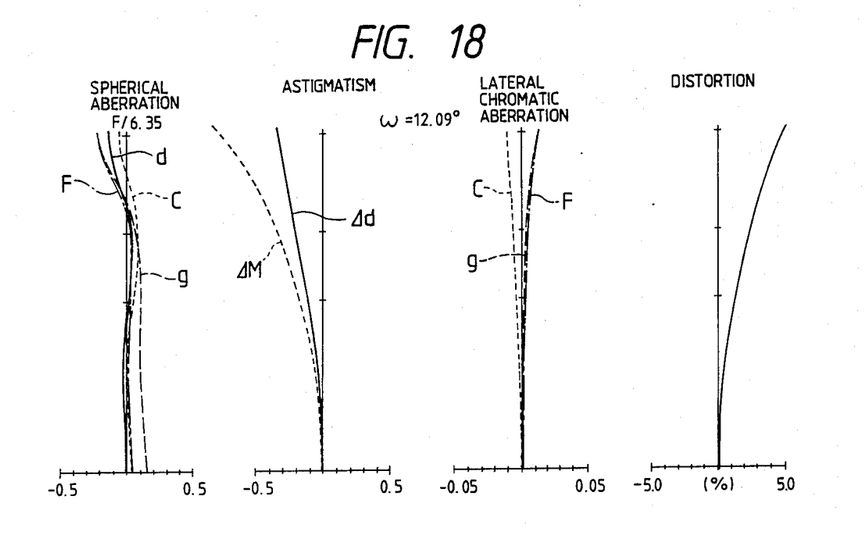

As for aberration characteristics of these Embodiments, those of the Embodiment 1 at the wide position, an intermediate focal length and the tele position thereof are illustrated in FIG. 4, FIG. 5 and FIG. 6 respectively, aberration characteristics of the Embodiment 2 at the wide position, an intermediate focal length and the tele position thereof are illustrated in FIG. 7, FIG. 8 and FIG. 9 respectively, and aberration characteristics of the Embodiment 3 at the wide position, an intermediate focal length and the tele position thereof are illustrated in FIG. 10, FIG. 11 and FIG. 12 respectively.

As is understood from the foregoing description, the zoom lens system according to the present invention permits simplifying the zooming mechanism, lens barrel structure, etc. owing to the design to shift the first lens group and the third lens group integrally for zooming, enables arranging a zooming cam, owing to the high vari-focal ratio, without adopting multiple structures for a zooming ring even when the lens groups are shifted for long distances, has a lens barrel of a large diameter and does not have a long total length. Further, the zoom lens system according to the present invention contains few factors to cause errors and can maintain stable image quality. Furthermore, the zoom lens system according to the present invention has a high vari-focal ratio and excellent performance in addition to the merits described above.

I claim:

1. A compact high vari-focal lens system comprising, in the order from the object side, a first lens group having positive refractive power, a second lens group having positive refractive power and a third lens group having negative refractive power, so adapted as to perform zooming by shifting the first lens group integrally with the third lens group along the optical axis and shifting the second lens group in a different locus in conjunction with the shift of the first lens group and the third lens group, and so designed as to satisfy the following conditions (1), (2) and (3):

$$0.2 < \phi_1/\phi_W < 0.9 \quad (1)$$

$$1.1 < \phi_{12W}/\phi_W < 1.9 \quad (2)$$

$$1.5 < \beta_{3T}/\beta_{3W} < 2.8 \quad (3)$$

wherein the reference symbol $\phi_W$ represents refractive power of the zoom lens system as a whole at the wide position thereof, the reference symbol $\phi_1$ designates refractive power of the first lens group, the reference symbol $\phi_{12W}$ denotes total refractive power of the first lens group and the second lens group at the wide position, the reference symbol $\beta_{3W}$ represents lateral magnification of the third lens group at the wide position, and the reference symbol $\beta_{3T}$ designate lateral magnification of the third lens group at the tele position.

2. A compact high-vari-focal ratio zoom lens system according to claim 1 wherein the first lens group comprises at least one negative lens component and at least one positive lens component, the second lens group is composed of a front subgroup comprising at least one negative lens component and at least one positive lens component, and a rear subgroup comprising at least two positive lens components and at least one negative lens component, and the third lens group comprises at least one positive lens component and at least one negative lens component.

* * * * *